PREWOVEN BIT-WIRE MEMORY MATRIX APPARATUS

Filed May 8, 1964 6 Sheets-Sheet 1

INVENTOR
JOHN S. DAVIS
BY Fraser and Bogucki
ATTORNEYS

INVENTOR
JOHN S. DAVIS
BY
Fraser and Bogucki
ATTORNEYS

INVENTOR
JOHN S. DAVIS
BY
Fraser and Bogucki
ATTORNEYS

PREWOVEN BIT-WIRE MEMORY MATRIX APPARATUS

Filed May 8, 1964 6 Sheets-Sheet 4

INVENTOR
JOHN S. DAVIS
BY
Fraser and Bogucki
ATTORNEYS

INVENTOR
JOHN S. DAVIS
BY
Fraser and Bogucki
ATTORNEYS

Jan. 6, 1970 J. S. DAVIS 3,488,638

PREWOVEN BIT-WIRE MEMORY MATRIX APPARATUS

Filed May 8, 1964 6 Sheets-Sheet 6

INVENTOR
JOHN S. DAVIS
BY
Fraser and Bogucki
ATTORNEYS

United States Patent Office 3,488,638
Patented Jan. 6, 1970

3,488,638
PREWOVEN BIT-WIRE MEMORY MATRIX APPARATUS

John S. Davis, Glendale, Calif., assignor to The Bunker-Ramo Corporation, Canoga Park, Calif., a corporation of Maryland Filed May 8, 1964, Ser. No. 365,891
Int. Cl. G11b *5/74*
U.S. Cl. 340—174 16 Claims

ABSTRACT OF THE DISCLOSURE

A woven configuration of a bit-wire memory utilizes certain orthogonal filamentary elements to develop selectively positioned discontinuities in the layer of remanently magnetic material deposited on the bit-wires to limit domain wall travel during operation of the memory.

This invention relates to memory devices of the woven wire type, and more particularly to woven screen memory devices having discrete information storage cells extending along particular interwoven wires.

Various schemes for utilizing magnetic wires to provide non-destructive readout memory devices have been proposed. The non-destructive readout capability of such devices results from the establishment of a strong magnetic anisotropy which favors circumferential orientation of remanent flux. The storage of binary coded information establishes circumferential flux states of one sense or the other. Axial interrogation fields may then be applied to read out the stored magnetization state by rotating the magnetization vector reversibly through an angle of less than 90°, thereby varying the circumferential component of magnetization without reversing the same. Since the magnetization vector rotation is reversible, the vector returns to its original orientation upon removal of the axial field, thus providing the desired non-destructive readout.

Various structural configurations, which have been proposed in an attempt to make practical utilization of the above-described principles of operation, have been generally referred to as bit-wire memory devices. One such configuration comprises a plurality of solid magnetic wires each having a plurality of tiny solenoids positioned thereon with interconnections between corresponding row solenoids to establish an orthogonal storage cell selection capability. Such an arrangement, however, has inherent limitations resulting from poor geometry, and devices having a tubular geometry have been proposed to overcome these deficiencies. Typical arrangements which have been proposed to this end call for the plating of a magnetic material on a non-magnetic wire or a suitably treated glass rod, with individual solenoids positioned thereon to define the resulting storage cells, which are interconnected as described to achieve coincident current selection of a given cell. A similar proposal calls for the interweaving of such magnetically coated wires with a plurality of orthogonal control conductors in order to overcome the relatively expensive and time-consuming step of interconnecting the individual solenoids. However, none of these proposed schemes, insofar as is known, has resulted in a bit-wire memory device which is completely satisfactory from a practical standpoint.

The problems of fabricating bit-wire memory structures of the types described are obvious. Any arrangement which requires the interconnection of tiny individual solenoids presents a cost factor which may be prohibitive. Attempts to obviate this problem by interweaving plated bit-wires with orthogonal information storage wires encounter the further problem of fracture of the thin magnetic film from the stresses of handling the bit-wires in the weaving process. These stresses also tend to destroy the anisotropy of the plated layer, thus precluding the use of the device as a non-destructive readout memory matrix. However, even if these problems are overcome, such structures are still subject to a further problem which has thus far prevented practical acceptance of these devices.

One significant attraction of structures of the types described is the increased storage cell density as compared with more conventional arrangements such as ferrite core memories. The increased cell densities can only be achieved if the interaction between the cells can be controlled. In a non-destructive readout memory such as is involved here, an individual storage cell must be capable of being interrogated innumerable times without interference to other cells or degradation of the stored magnetization condition. In these structures, each individual storage cell may be envisioned as a small tubular section of continuous cylindrical thin film plated along an entire bit-wire. As such, an individual cell necessarily requires discrete boundaries which separate it from adjacent storage cells. A typical bit-wire structure uses a five-mil diameter, beryllium copper wire on which a thin film of permalloy approximately one micron in thickness is deposited. Minimum cell lengths of 15 bit-wire diameters are reported with a minimum cell spacing of 50 diameters along the bit-wire. However, as is reported by U. F. Gianola in the "Journal of Applied Physics," vol. 34, No. 4 (Part 2), at p. 1131, there is a problem with word field spreading which adversely influences the cell density along the bit-wire. The report notes that the influence of this factor is more severe than had been anticipated since such fields applied repetitively to a fixed address (as is the case in a non-destructive readout operation) gradually disturb the magnetization of neighboring storage cells, even though the fields are well within the critical thresholds for static fields. The problem appears related to the fact that well defined magnetic domain walls exist at the boundaries of each individual cell and these walls are assumed to move outwardly from the cell under repetitively pulsed interrogation fields. It is believed that this problem will be encountered in any structure employing a continuous cylindrical film for bit storage. The problem may be obviated by selective etching to remove the film between adjacent storage cells, but until now there has been no practical mechanism for accomplishing this insofar as is known. The alternative is to spread the cells further out along the individual bit-wires, but this destroys the cell density advantage previously thought to be provided by these structures and still does not provide the assurance of reliable long-term operation which is sought.

It is therefore a general object of the present invention to provide an improved mangetic memory device.

More specifically, it is an object of the present invention to provide an improved bit-wire memory structure.

It is a further object of the present invention to increase the permissible storage cell density in a bit-wire memory device.

A more particular object of the present invention is to obviate the problem of cell boundary movement during repeated interrogation of a bit-wire memory device.

Briefly, bit-wire memory structures in accordance with the present invention comprise arrangements which may be fabricated by weaving the respective bit-wires with the orthogonal control, or drive, conductors before the layer of magnetic plating is deposited on the bit-wires. Fabrication of these devices in this manner advantageously results in a structure which inherently provides the desired masking of the bit-wires during the plating process. The masked areas develop the desired discontinuities in the plating layer which serve to limit domain wall travel along the bit-wire under repeated interrogation during operation of the completed structure as a memory device. Furthermore, the masked areas of the bit-wires may be arranged, in accordance with an aspect of the invention, to be precisely located with respect to the positions of the individual storage cells so as to define the cell boundaries. Moreover, when fabricated in accordance with the invention, woven screen bit-wire structures may obtain the advantages derived from fabrication by an automatic weaving process without being subject to the problems of undue stresses imposed on the plated layer of the bit-wires, which is a concomitant result of attempting to weave the bit-wires after they have been plated. If desired, however, particular principles of the present invention may be adapted to prior art bit-wire structures to provide selective etching of the plated layer in order to develop cell boundaries in such structures.

Particular structural arrangements and fabrication methods in accordance with the invention are employed to enhance the masking effect which is realized when the plating of a magnetic layer on the bit-wires is performed after the interweaving of the bit-wires and the orthogonal drive, or control, conductors. In addition to the bit-wire and orthogonal drive conductors, both of which may be employed to carry current during the operation of the device, a plurality of masking filaments may be interwoven in the matrix to control the spacing between cells and enhance the masking effect, thus improving the definition of the individual cell boundaries. In a preferred embodiment, the bit-wires are uninsulated, beryllium copper conductors while the orthogonal drive conductors comprise small wires covered with a layer of relatively hard electrical insulation. The bit-wires may, if desired, be in the form of rods of a non-conductive material coated with a conductive substrate (e.g. silvered-glass cane) suited to accept the magnetic layer. As the term "bit-wire" is used herein, it will be understood to include such equivalent structure. The masking filaments, where utilized, do not carry current and therefore are preferably not wires but rather a plurality of threads or fibers of a relatively soft insulating material such as Teflon. In one preferred embodiment in accordance with the invention, the masking filaments are substantially larger in diameter than the orthogonal insulated drive wires and these filaments are woven more tightly against the bit-wires than are the insulated drive wires so that a more intimate contact over a substantial area of the bit-wire is maintained with the masking filaments than with the drive conductors. During the subsequent plating process, the masking filaments prevent the areas of contact with the bit-wires from receiving any of the magnetic material. Since the masking filaments are woven between adjacent storage cell positions along an individual bit-wire, the resulting plated magnetic layer develops substantial discontinuities at the ends of the storage cells in the areas between adjacent storage cells. The masking filaments, being tightly woven of a relatively soft insulating material, are drawn down around the individual bit-wires so that the bit-wires are partially encircled by the filaments. The orthogonal drive wires in this arrangement, being more loosely woven and having an outer covering of a relatively hard insulating material, do not establish contact with any substantial area of the bit-wires, even though they pass across the bit-wires in the woven structure and are woven with sufficient tightness of weave to establish the desired inductive coupling with the bit-wires. Therefore, within the individual storage cells proper of this particular embodiment, there is little, if any, discontinuity in the deposited magnetic layer which is plated after the weaving step is completed.

In another particular embodiment, the bit-wires and drive wires may be interwoven without the addition of masking filaments, thus reducing the spacing between the cells. In this embodiment, the drive wires are woven more tightly so that they provide the desired masking of the bit-wires during the plating process, thus developing discontinuities in the plating layer within each individual cell which inhibit domain wall travel outward from the cell or inward from adjoining cells while still permitting closed rings of magnetic material within a cell to serve as the desired storage medium.

A number of steps may be performed during the fabrication process in order to enhance the masking effect of the masking filaments. For example, a woven screen of bit-wires, orthogonal drive conductors, and masking filaments may be calendered in a fabrication step performed between the weaving and plating steps in order to extend the areas of contact between the bit-wires and the masking filaments. The contact areas may be further extended by heating the bit-wires, as by driving sufficient current through them to soften the insulation of the masking filaments from the $I_2R$ power dissipation generated in the bit-wires, without affecting the insulation of the orthogonal drive conductors. In such a case, the orthogonal drive conductors are coated with an insulation having a higher softening point than that of the masking filaments.

In another particular arrangement in accordance with the invention, spacing filaments are interspersed between adjacent bit-wires and running in the same direction of the weave. The spacing filaments and the bit-wires are then interwoven with the masking filaments and the orthogonal drive, or control, conductors in a fashion which permits the orthogonal drive conductors to skip across adjacent sets of spacing filaments and bit-wires, whereas the masking filaments are interwoven without skipping. Such an arrangement facilitates the spatial separation between the bit-wires and the orthogonal drive conductors while permitting the masking filaments to be maintained in intimate contact with the bit-wires and results in a storage cell having a plated magnetic layer without any gaps or discontinuities therein between the boundaries of the cell.

Each of the above-described embodiments of the invention is contemplated in a single crimp, basket weave configuration wherein the bit-wires are maintained substantially straight and the filaments woven therewith extend over and under the bit-wires. The masking effect of these arrangements may be enhanced, if desired, by weaving the structures with a double crimp; that is, the filamentary members running in both the warp and woof directions of the weave are arranged to curve over and under each other between the two surfaces of the screen. A double crimp weave enhances the "wrap-around" effect at the respective crossings of the interwoven filamentary members, thus increasing the individual contact areas at the crossings so that more effective cell boundary discontinuities are obtained. The double crimp weave is achieved by controlling the tensions applied to the respective filamentary members during the weaving process so that the filamentary members in both the warp and woof directions of the fabric are crimped at the respective crossings of the individual fibers.

The resulting woven screen enhances the masking effect of the masking filaments with respect to the associated bit-wires at the individual intersections thereof, since the bit-wires are now partially wrapped around the intersecting masking filaments by virtue of the crimp put in the bit-wires at each intersection with the masking filament. Plating a magnetic layer over the double crimp woven screen structure provides increased areas of discontinuity in the layer plated along the bit-wires and improves the boundaries which are established with respect to the individual cells extending along the bit-wires.

It may be desirable in particular arrangements in accordance with the invention to make use of a suitably positioned masking filament as the basis for a selective etching step in defining individual cell boundaries during the fabrication of bit-wire storage devices. This is particularly true in the case of pre-plated bit-wires, i.e., where the bit-wires are plated prior to interweaving or other association with the drive wires, since the only practical way to locate the desired discontinuities in the plating layer which constitute the cell boundaries is to establish the discontinuities after the drive conductors are in place so that the storage cells are already determined. In accordance with one aspect of the invention, therefore, a bit-wire structure may be provided in which masking filaments are selectively interwoven along the drive conductors, preferably at the edges of the individual storage cells. In the case of structures of the type described above which are to be plated after weaving, the plating step is then performed. Next the structure is prepared for selective etching. The entire structure may be coated with a suitable etchant-resistant material which serves to protect the coated portions of the plated layer from the etchant. Thereafter the structure may be heated or otherwise treated to remove the selectively positioned masking filaments. The masking filaments comprise a material which melts or otherwise decomposes under such treatment, leaving small bands on the plated bit-wires which are not coated with the etchant-resistant coating. These bands are located, as were the masking filaments, at the edges of the individual storage cells precisely where the discontinuities in the plating layer defining the cell boundaries are desired. Thereafter the structure is selectively etched, as by immersion in an etchant bath, to selectively remove the plated layer from the unprotected portions thereof. This particular aspect of the invention is of considerable importance in those bit-wire devices which are fabricated with pre-plated bit-wire, since it provides a simple arrangement for establishing desired discontinuities in the plated layer at appropriate positions which prevent domain wall travel from cell to cell and thus permits a substantial increase in the permissable density of the storage cells in such structures.

It should be understood that, although the layer of magnetic material constituting the storage medium is referred to herein as a plated layer, the invention is not limited to devices on which a magnetic layer is plated as contrasted with other methods of deposition. Rather the invention contemplates any corresponding arrangements on which such a layer is deposited, as by electroplating, electroless plating, vapor deposition, spraying, and the like, and it will be understood that the term "plated layer" is employed for convenience and not for limitation. However, where an actual plating process is employed in depositing the magnetic layer on the substrate, particular currents may be applied to the substrate wires in accordance with an aspect of the invention to develop the domain orientation in the desired circumferential direction around the bit-wires as the magnetic layer is being plated thereon. These currents are applied by connecting the bit-wires of the woven planar array in series, thus providing an efficient arrangement for controlling the domain orientation during plating.

A better understanding of the present invention may be had from a consideration of the following detailed description taken in conjunction with the accompanying drawings, in which.

Figure 1:
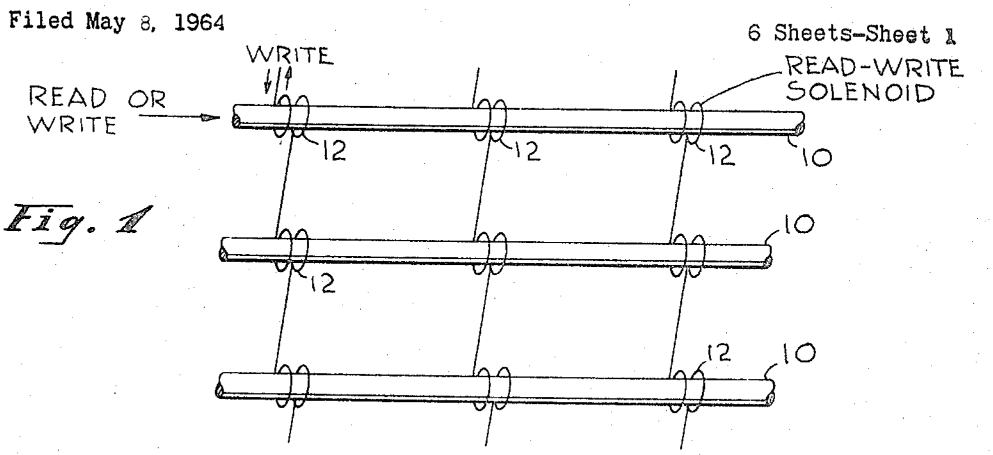
FIG. 1 is a representation of a known prior art bit-wire memory structure.

In FIG. 1, which represents a portion of a bit-wire memory arrangement of the prior art, a plurality of bit-wires 10 is shown, each being encircled by associated solenoids 12 which are positioned at respective discrete positions along the bit-wires 10. As shown, the bit-wires 10 are arranged horizontally and the solenoids 12 are serially connected by vertical rows to establish an orthogonal matrix. Each particular portion of a bit-wire 10 associated with a solenoid 12 represents an individual storage cell. Coincident current selection of an individual cell for the storage of information therein may be accomplished by applying an amplitude-limited current to the vertical row containing the individual solenoid 12 in coincidence with an enabling current through the corresponding bit-wire conductor 10. The transverse magnetic field of the bit-wire current reduces the minimum switching field which is required to be applied by a solenoid 12. Therefore, since the solenoid current is limited, only the magnetization in the selected storage cell is reversed to record the particular information being stored. The direction of the solenoid current determines the particular binary digit which is stored by the coincident current selection. Interrogation is performed by pulsing a current through the bit-wire conductor 10 containing the particular storage cell or cells to be read out on either a bit-organized or word-organized interrogation operation. In either case the stored information is read out at the corresponding column of the interrogated cells.

Figure 2:
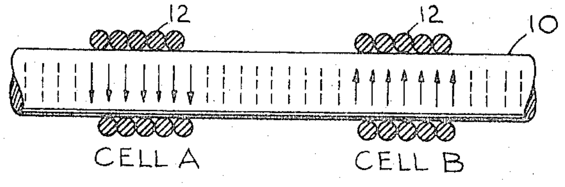
FIG. 2 is sectional diagram of a portion of the arrangement of FIG. 1 representing the magnetic domain orientation.

The difficulty with operating a structure of the type shown in FIG. 1 for non-destructive readout lines is the fact that repetitive interrogation of the individual cells results in a creeping of the domain walls at the boundaries of the cells which interferes with the magnetization states of adjacent cells. This problem may be better visualized from an examination of FIG. 2 which depicts a section of bit-wire 10 and the solenoids 12 of two adjacent storage cells A and B. Stored binary information is represented by clockwise or counterclockwise magnetization of the small cylindrical segments of the magnetic film of the bit-wire 10. The individual magnetic domains may be considered oriented as shown by the arrows of FIG. 2, for two different storage states of the two cells, A and B. Because of the cylindrical film geometry, there is zero demagnetizing field in the remanent magnetization states of the film so that theoretically the magnetization state may be maintained indefinitely without degradation. However, as the bit-wire 10 is repeatedly interrogated under non-destructive readout operation, more and more domains adjacent the apparent ends of the individual storage cells become aligned with the cell domains, with the result that the cell boundary creeps outwardly from its initial location. For cells which are sufficiently close together, there eventually results an interaction from this domain wall extension which produces a gradual disturbance of the magnetization of storage cells which are not being interrogated. Thus far, it has been necessary to extend the spacing between adjacent storage cells farther than was originally contemplated in order to obviate the problem just described. However, this limits the effectiveness and efficiency of the bit-wire memory structure and also adversely affects its reliability in long term operation. This undesirable effect is noted whether the actual magnetic field is generated by a solenoid such as 12 associated with the bit-wire 10 or originates from current along conductors which are interwoven with the bit-wires 10. In order to develop an effective bit-wire memory structure, some means for limiting domain wall travel by effectively defining the boundary of an individual cell is needed.

Figure 3:
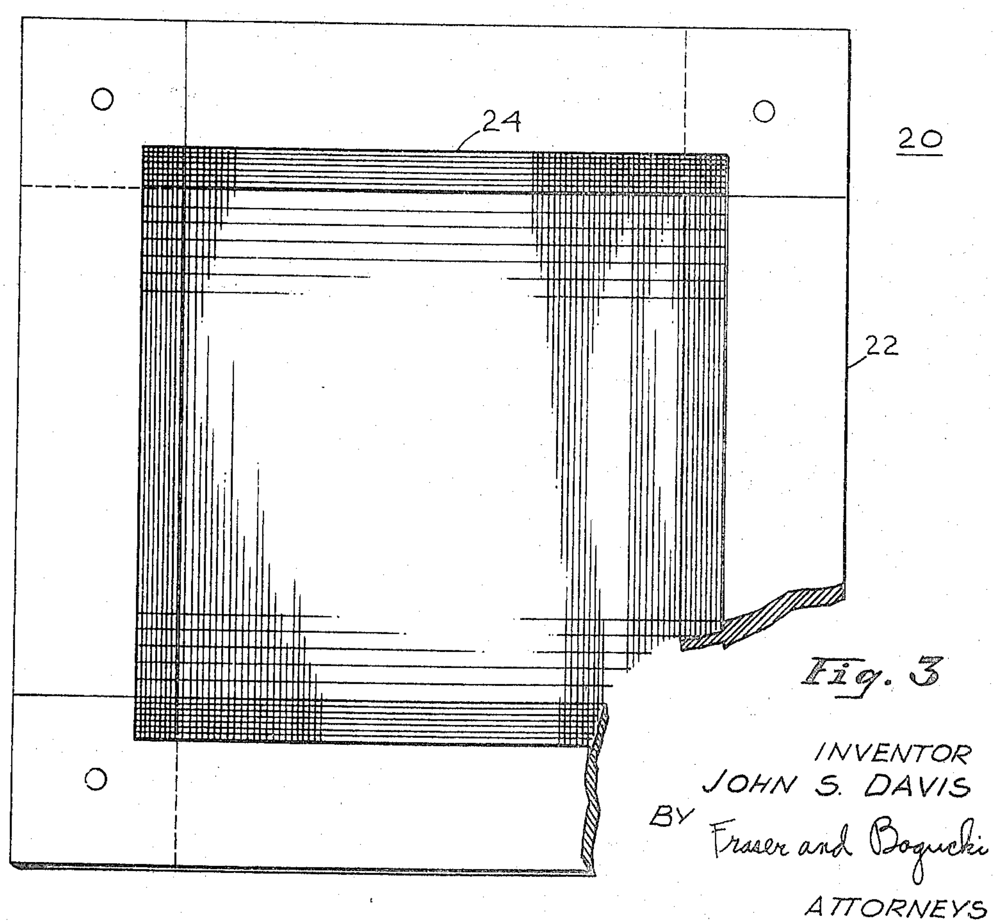
FIG. 3 is a representation of a bit-wire memory matrix in accordance with the present invention.

A general representation of a woven screen bit-wire matrix in accordance with the present invention having the capability of limiting domain wall travel is shown in FIG. 3. Each of the various particular structural configurations in accordance with the present invention which are described herein may be considered to be utilizable as a portion of the structure generally represented in FIG. 3. In this figure, a given memory matrix 20 is shown comprising a frame 22 in conjunction with a woven bit-wire screen 24. The frame 22 may be made up of sections of copper bar arranged to overlap in the corners and riveted or spot-welded together. The edges of the screen 24 overlap the frame 22 and may be spot-welded to the frame 22 in the overlapping corners thereof, since these areas do not represent information storage cells of the woven screen. Suitable terminals (not shown) for permitting electrical connections between associated circuitry and the individual conductors of the woven screen 24 may be embedded in the frame 22 and connected to the conductors of the screen 24. The result is a structure which may be readily fabricated by weaving on an automatic power loom, by thereafter attaching the screen to a frame containing a plurality of terminals for providing the desired connections to the screen conductors, which frame serves to maintain and protect the structural configuration of the woven screen during subsequent fabrication and operation of the matrix and finally by plating the screen 24 with a layer of remanently magnetic material which selectively provides the desired cylindrical layer about the bit-wires of the screen 24. Since only the bit-wires have a surface which will accept the plating of the magnetic layer, the layer is deposited only on the bit-wires, and then only on the portions thereof which are exposed. Where the bit-wires are covered by interwoven filamentary members, they are effectively masked during the plating process so that a discontinuity in the plated layer is developed at each such area of contact between the bit-wires and the masking filaments.

Figure 4:
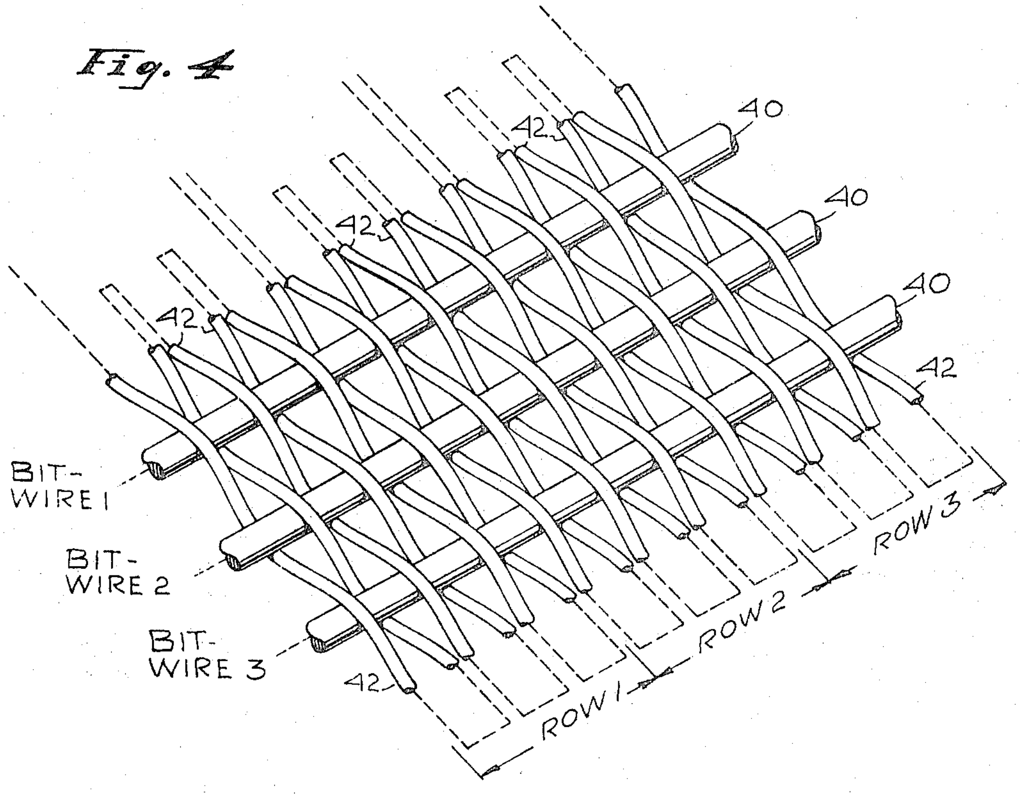
FIG. 4 is a representation of one particular arrangement in accordance with the invention which may be utilized as a portion of the structure of FIG. 3.

FIG. 4 is a perspective view of a portion of one particular arrangement in accordance with the invention showing, in effect, a three-by-three matrix of bit-wire storage cells. The matrix is fabricated by interweaving a plurality of uninsulated bit-wires 40 with a plurality of filamentary members in the form of insulated control, or drive, conductors 42 which are interconnected electrically to form the drive leads for the respective cells. Following completion of the weaving process, the resulting screen structure is coated with a suitable magnetic layer as, for example, by immersion in an eletcrolyte in a plating step in which a layer of magnetic material is deposited on the bit-wires 40. The bit-wires 40 are effectively masked by the filamentary members, i.e., the orthogonal control conductors 42, so that the deposited layer develops discontinuities therein at each area of contact between the insulation of the control conductors 42 and the bit-wires 40. As a result, each individual cell comprises a number of closed cylindrical segments about the bit-wire 40 interspersed with open ring segments having gaps at the areas of contact between the intersecting conductors. While the closed cylindrical segments experience a zero demagnetizing force, the open ring segments by virtue of the gap in the plated magnetic layer develop a demagnetizing force which effectively limits domain wall travel from one storage cell to the next. As will be described in further detail hereinafter, the dimensions of the individual segments, that is, the thickness of the magnetic layer and the extent of the gap in the open ring segments, may be controlled to establish a demagnetizing force in these segments which prevents the unwanted domain wall travel outwardly from the ends of an individual cell or inwardly across the cell boundaries from an adjacent cell. With a given cell, however, the individual closed cylindrical segments are magnetized alike by coincident currents applied along a given bit-wire and the control conductors which select that cell. Thus, for example, the cell in the upper left-hand corner of FIG. 4 may be selected by applying current along bit-wire 1 and the conductors 42 in row 1 of the matrix. Upon interrogation by applying a current along the bit-wire 1, the voltages induced in the conductors 42 by reversible rotation of the magnetization states of the individual closed cylindrical segments of the plated layer of the given cell are additive, resulting in an output pulse indicative of the stored information state.

In cases in which the magnetic layer is deposited on the bit-wires 40 by a plating process following the weaving of the bit-wires 40 and the drive or control conductors 42 in a planar array, the desired circumferential orientation of the magnetic domains may be enhanced by connecting the bit-wires 40 in series and applying a current to the resulting circuit to establish a circumferential magnetic field about each bit-wire 40 in the array. Moreover, if desired, a current may also be applied to a series path comprising the drive conductors 42 to reinforce the ambient magnetic field which is maintained during the plating process.

Figure 5:
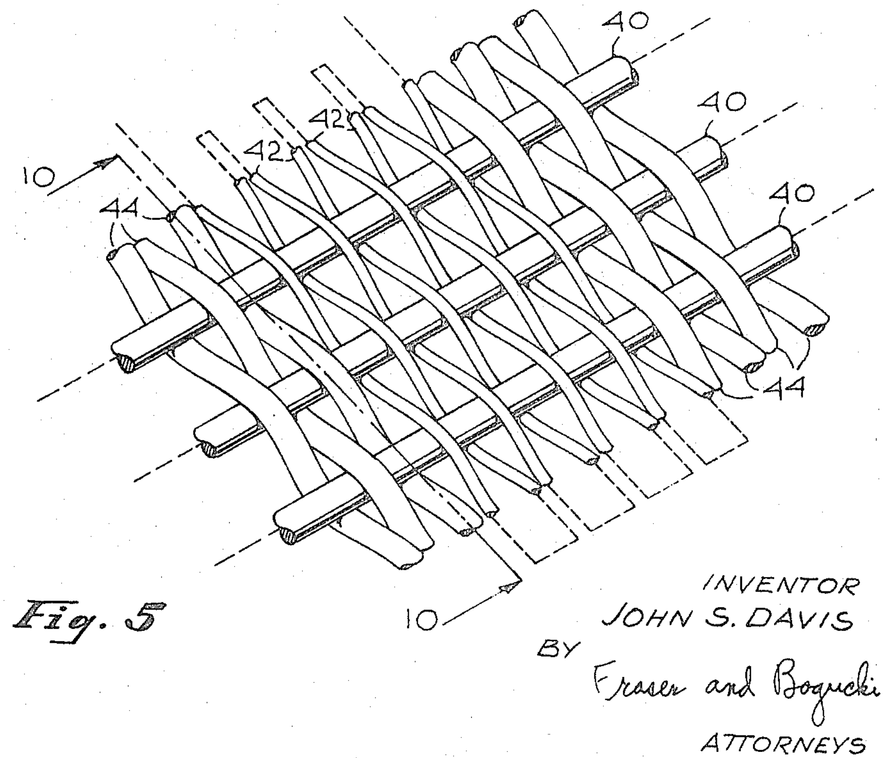
FIG. 5 is a representation of another particular arrangement in accordance with the invention.

The masking effect of the interwoven conductors may be enhanced for improved definition of the individual cell boundaries in accordance with a particular aspect of the invention by employing additional filamentary members interwoven with the drive, or control, conductors 42 in the manner shown in FIG. 5. The addition of masking filaments as described not only improves the definition of the individual storage cell boundaries, but it also controls the spacing between adjacent storage cells so as to further limit the unwanted interaction between the magnetization states of adjacent cells. However, where maximum density of storage cells in a given matrix is desired, the arrangement of FIG. 4 may be employed without the use of such masking filaments which inherently increase the spacing between cells and thus reduce the permissible cell density.

In FIG. 5, which represents a perspective view of one particular arrangement in accordance with the invention which may be utilized in the structure of FIG. 3, three bit-wires 40 are shown interwoven in a single crimp, basket weave with a plurality of orthogonal control conductors 42 and a plurality of masking filaments 44. As represented, the bit-wires 40 are woven without bending while the elements 42 and 44 which are interwoven with the bit-wires 40 are woven over and under the various bit-wires 40 to develop the single crimp weave. In one particular mode of operation, the portion represented in FIG. 5 may correspond to three separate storage cells, storage and interrogation of information being effected by appropriate currents along the selected bit-wires 40 and the serially connected control conductors 42. It will be understood that the bit-wires 40 of one particular arrangement are coated with a layer of magnetic material plated thereon after the weaving step is completed by, for example, immersing the entire woven screen structure in a bath of electrolyte and connecting the bit-wires 40 as the anode of the electroplating circuit. Since the control conductors 42 are insulated and the masking filaments 44 are composed of an insulating material, the magnetic layer is plated only on exposed surfaces of the bit-wires 40. The masking effect of the filamentary elements interwoven with the bit-wires 40 develops the aforesaid discontinuities in the plating layer and results in an improved storage cell of the bit-wire memory type.

Figure 6:
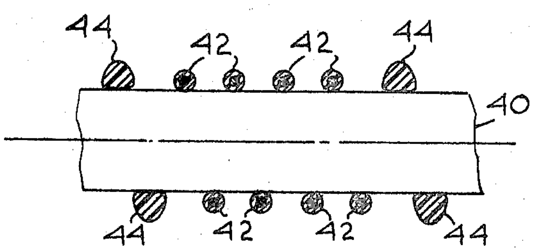
FIG. 6 is a sectional diagram of a portion of the arrangement shown in FIG. 5.
Figures 7, 8:
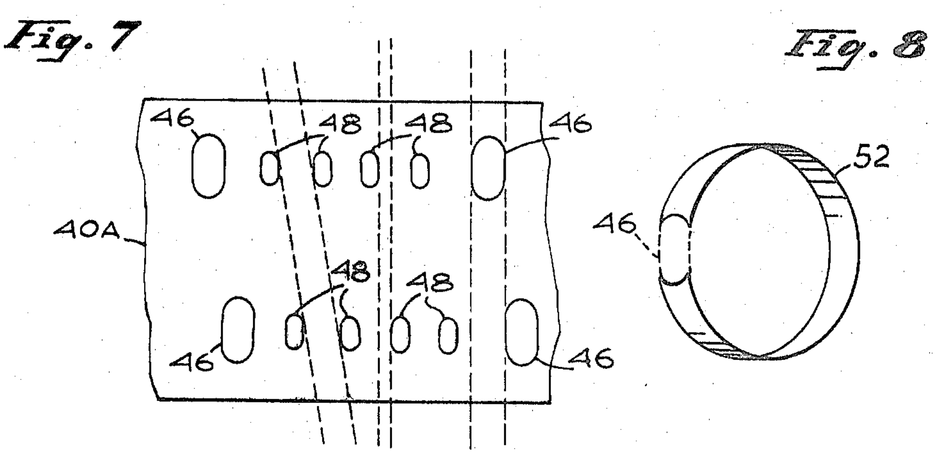
FIG. 7 is a view of the plated magnetic layer of the arrangement shown in FIG. 6 as it would appear if slit lengthwise and opened out flat.
FIG. 8 is a representation of a section of the structure shown in FIG. 7.
Figure 9:
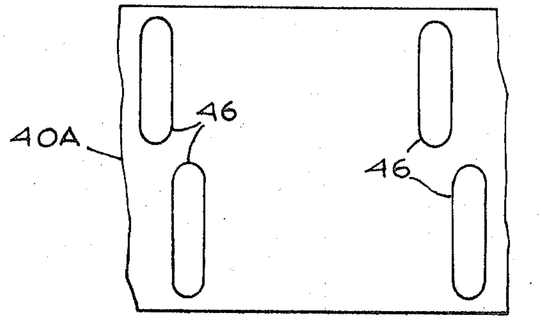
FIG. 9 is a representation of an idealized arrangement of the plating layer shown in FIG. 7.

This effect may be better appreciated from a consideration of FIGS. 6, 7, 8 and 9 which show portions of an individual bit-wire memory cell fabricated under various conditions. FIG. 6 represents a sectional view of a central portion of one of the bit-wires 40 of FIG. 5, together with the orthogonal control conductors 42 and a pair of masking filaments 44 at each end of the corresponding cell. If the magnetic layer plated on the bit-wire 40 of FIG. 6 were slit longitudinally along the brake line and spread out flat, it would appear somewhat as shown in FIG. 7. The layer will be designated by a reference numeral 40A and is shown having a number of relatively large apertures 46 and a plurality of smaller apertures 48. The apertures 48 are due to the slight masking effect during the plating process of the conductors 42 which in FIG. 6 are shown as being in light contact with the bit-wire 40. The larger apertures 46 which represent the desired discontinuities in the plated layer 40A at the ends of the storage cell result from the masking effect of the masking filaments 44. By the use of particular techniques in accordance with the pesent invention to be described hereinafter, the apertures or discontinuities 46 can be enlarged while the apertures 48 are diminished to the vanishing point as represented in FIG. 9. This is close to the ideal condition which is attainable wherein the large apertures 46 positioned at the opposite ends of an individual storage cell become almost continuous bands about the bit-wire 40 in which no magnetic material is to be found. In these configurations in accordance with the invention, the large apertures 46 serve as effective boundaries of the storage cell so as to prevent the undesired domain travel toward adjacent cells. Although only two apertures 46 are shown at each end of the storage cell depicted, additional sets of apertures may be provided as needed by the addition of more masking filaments 44 as shown in FIG. 5.

FIG. 8 represents a particular portion of an individual storage cell in accordance with the invention, specifically a portion of the plating layer between the dot-dash lines of FIG. 7, and is included for the purpose of explaining the principles of the invention. The section shown in FIG. 8 is in the form of an open ring 52 of the plating layer which encompasses a single bit-wire 40. As such, the open ring 52 provides a structured configuration which presents a barrier to domain wall travel along the bit-wire, and thus effectively serves to define fixed boundaries for the individual bit-wire storage cells. It will be noted that the cylindrical film geometry of conventional bit-wire storage elements results in a zero demagnetizing field in the remanent states. In structural arrangements in accordance with the present invention, however, those portions of the bit-wire which exhibit discontinuities in the plating layer, such as the portion illustrated in FIG. 8, correspond to air gaps in the cylindrical segments. The resulting magnetic poles existing at the ends of the air gaps cause magnetic fields to be present about the open ring section. These self-fields are directed in the opposite direction to the initial field including the remanent magnetization state, and are thus referred to as demagnetizing fields. The true field acting on a given section of the open ring 52 is the resultant of the applied field and the demagnetizing field. The result is a remanent magnetization state having a field strength which is less than it would be if the demagnetizing field were zero. The demagnetizing field $\Delta H$ is approximately proportional to the intensity of magnetization I in accordance with the following expression:

$$\Delta H = NI$$

The proportionality factor N is called the demagnetizing factor and depends primarily on the shape of the magnetic element. By controlling the length of the air gap in the ring 52 and the relationship of the length, width and thickness of the ring 52, the remanent magnetization of such a segment can be completely destroyed. Thus, it becomes impossible for magnetic domains to extend across such a segment so that the domain wall travel may be eliminated in accordance with the principles of the present invention. The gap in the ring 52 is controlled in accordance with the invention by the area of contact between the overlapping masking filaments 44 and the bit-wires 40 (or in the embodiment of FIG. 4, between the woven conductors 42 and the bit-wires 40), since this is the portion which is prevented from being plated. In preferred embodiments of the invention in which masking filaments 44 are employed, the contact area is made relatively large, while the discontinuities in the plating layer under the control conductors 42 are made relatively small. Thus there remains sufficient magnetic material in continuous cylindrical configuration within the bit-wire storage cell proper to establish the desired remanent magnetization states. The precise configuration of the closed cylindrical portions of an individual storage cell have not been determined; they may correspond to one of the closed loop sections represented by the dashed lines of FIG. 7, either having a cylindrical axis which is coaxial with the bit-wire 40 or having an axis slightly skewed with respect to the bit-wire axis. The coaxially aligned axis arrangement is considered preferable for non-destructive readout, although the skewed configuration should be acceptable if repetitive readout is not required. The arrangement shown in FIG. 9 results from particular woven configurations in accordance with the invention in which the control wires 42 are loosely woven so that no contact is maintained with the bit-wire 40 which would preclude the deposition of a plating layer on the bit-wire 40 in that portion of the cell.

Figure 10:
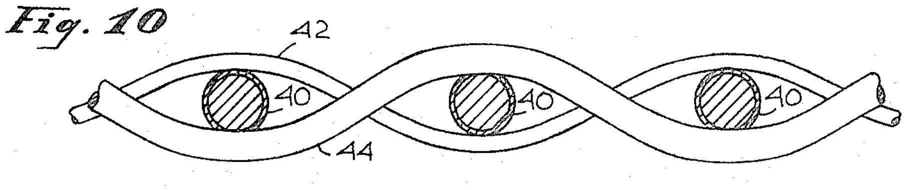
FIG. 10 is an end view in section of the particular arrangement of the invention appearing in FIG. 5.

FIG. 10 is a sectional view taken along the line 10—10 of FIG. 5 and shows a significant spacing between the bit-wires 40 which are interwoven with the filaments 44 and the drive conductors 42, such as might result in the configuration of the plating layer 40A which is shown in FIG. 7. In this arrangement the masking filaments 44 are of larger size and of a softer material than the insulated drive conductors 42, so that the area of contact between the bit-wires 40 and the masking conductors 44 is greater with a consequent effective masking of the bit-wires 40 at the ends of the individual storage cells.

Figure 11:
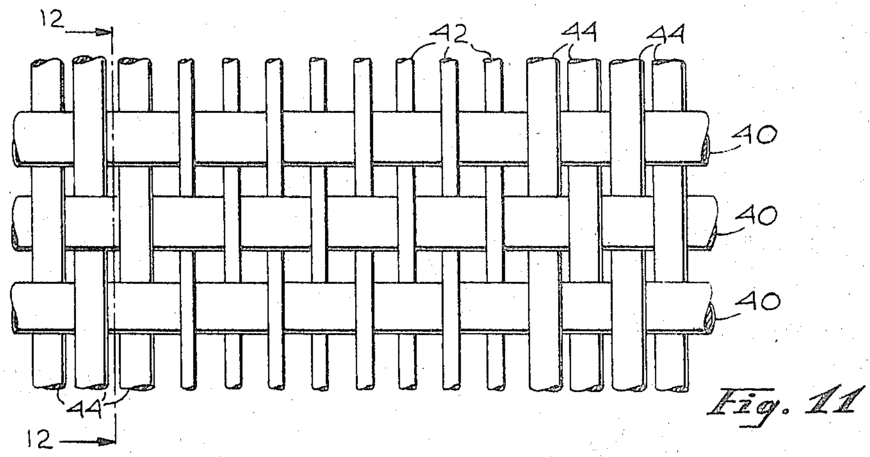
FIG. 11 is a plan view of another particular arrangement in accordance with the invention.
Figure 12:
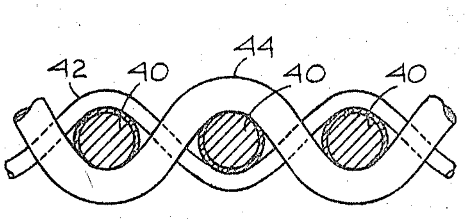
FIG. 12 is an end view in section of the particular arrangement shown in FIG. 11.

FIGS. 11 and 12, plan and sectional views respectively of one particular arrangement in accordance with the invention, depict bit-wire cells developed along three bit-wire conductors 40 which are spaced more closely together in a tighter weave than in the arrangement of FIG. 5. A closer spacing of the bit-wires 40 advantageously increases the wrap-around effect of the masking filament 44 with a corresponding increase in the area of contact between the bit-wire 40 and the masking filament 44 so that the aperture 46 (see FIG. 7) provides a more effective discontinuity in the plated magnetic layer 40A. In this particular arrangement, the wrap-around effect of the control conductors 42 is also greater but the effective amount of the plated layer 40A which is available for remanent magnetization is maintained by increasing the spacing between the adjacent control conductors 42 while maintaining the masking filaments 44 spaced closely together.

Figure 13:
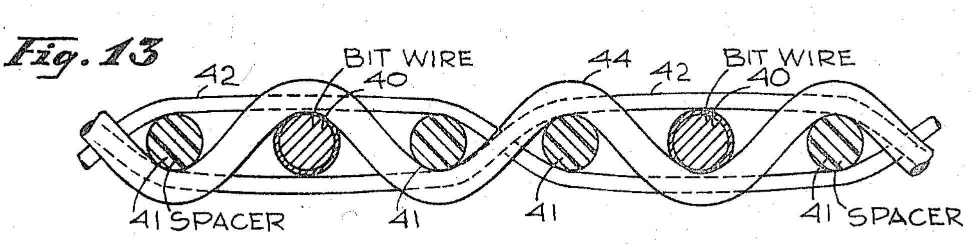
FIG. 13 is an end view in section of still another particular arrangement in accordance with the invention.

Still another particular arrangement in accordance with the invention is depicted in FIG. 13 which results in a layer 40A plated on an individual bit-wire 40, similar in appearance to the representation shown in FIG. 9. FIG. 13 represents a sectional view of a portion of a bit-wire matrix in which relatively large, soft masking filaments 44 and smaller drive conductors 42 are interwoven with a plurality of bit-wires 40 and spacer filaments 41. It will be noted that the masking filament 44 passes over and under each of the spacer elements 41 and the bit-wires 40 in a plain over-under weave, whereas the control conductors 42 cross a spacer element 41, a bit-wire 40 and another spacer element 41 before being threaded through to the other side of the screen. Since each individual control conductor 42 passes across without being wrapped around an individual bit-wire 40, there is no actual contact between the bit-wires 40 and the drive conductors 42. Consequently, this particular weave configuration advantageously eliminates the apertures 48 in the plated layer 40A, shown in FIG. 7 from the internal region of an individual storage cell while maintaining the extended areas of discontinuity resulting from the wrap-around effect of the masking filaments 44. As a result a plating layer for an individual storage cell similar to that shown in FIG. 9 is developed.

Figure 14:
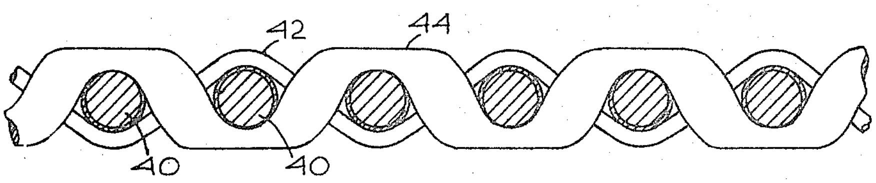
FIG. 14 is an end view in section of one particular arrangement in accordance with the invention as it appears during the fabrication process.

The weaving of various arrangements in accordance with the invention may be accomplished according to the techniques described in patent application Ser. No. 322,872 of David Boles et al., entitled "Apparatus and Methods for Woven Screen Memory Devices" filed Nov. 12, 1963, and now U.S. Patent No. 3,377,581. Following the weaving step, it may be desirable to perform a step which will further increase the area of contact between the masking filaments 44 and the bit-wires 40. One way of accomplishing this is to calender the woven structure to the extent that compressive forces are exerted on the masking filaments 44 without being aplied to the drive conductors 42. FIG. 14 represents a portion of a woven structure after the calendering step and shows how the masking filament 44 is partially flattened and pushed down around the individual bit-wires 40, although its added thickness prevents the drive conductors 42 from being similarly affected. A similar effect may be achieved by heating the entire structure to soften the plastic of the masking filaments 44 and result in their further encompassing the bit-wires 40. The drive conductors 42 are insulated with a material having a higher softening point so that a similar effect does not result with respect to these conductors. The heating effect may advantageously be achieved by running sufficient current through the bit-wires 40 to develop sufficient heat from the $I^2R$ power dissipation to soften the plastic of the masking filaments 44 in this fashion.

In any woven configuration in which the drive conductors are in contact with the bit-wires 40 and it is desired that there be no discontinuities resulting from such contact in the plating layer 40A along the extent of an individual bit-wire storage cell, it may be desirable to pass the woven structure through an etching bath following the weaving process. Immersion in an etchant eats away some of the material forming the contact between the bit-wires 40 and the drive conductors 42. While a similar effect may result with respect to the masking filaments 44, limiting the time of immersion in the etchant effectively eliminates the relatively small areas of contact between the bit-wires 40 and the drive conductors 42 without significantly reducing the areas of contact between the bit-wires 40 and the masking filaments 44.

Following the processing thus described, the entire woven structure is then prepared for the deposition of a plating layer on the bit-wires 40. Although the entire structure may be immersed in a suitable electrolyte, deposition of the plating layer occurs only on the bit-wires 40 because these are the only conducting surfaces capable of accepting such a layer in the plating path. Moreover, the layer is selectively deposited only on the portions of the bit-wires 40 which are not masked by the masking filaments 40. The plating step may be performed according to certain of the techniques described in co-pending application Ser. No. 264,127, of John S. Davis et al., entitled "Coating Method and Product" filed Mar. 11, 1963, and now U.S. Patent No. 3,292,164. Following the plating step, the fabrication process may be completed by cleaning the matrix and preparing it for connection to external circuitry for operation in the storage and readout of binary coded information.

Figure 15:
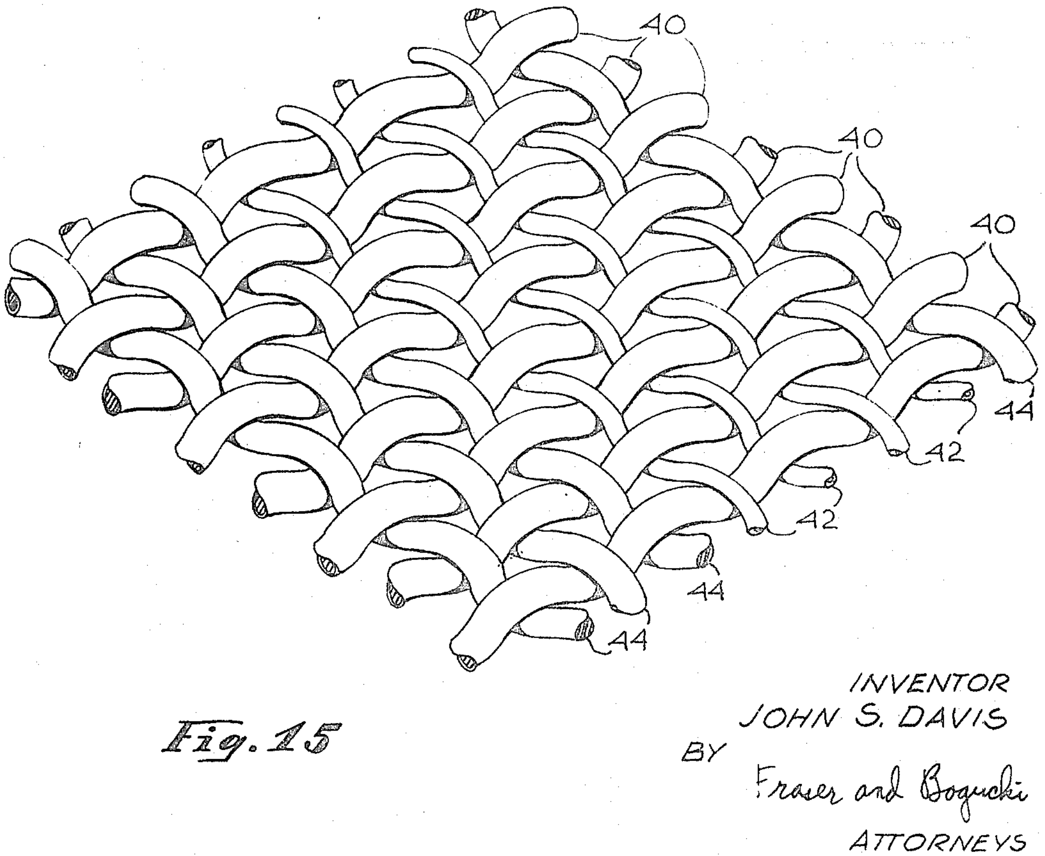
FIG. 15 is a perspective view of a portion of another particular arrangement in accordance with the invention.

A portion of still another particular arrangement in accordance with the invention is depicted in FIG. 15 which shows a plurality of bit-wires 40, drive conductors 42 and masking filaments 44 interwoven to form bit-wire storage cells as described. This particular configuration, however, employs a weave which develops a double crimp; that is, the filaments running in both the warp and woof directions are crimped at each intersection with another filament. This results in the bit-wires 40 being crimped rather than being maintained in a straight configuration as was the case in the arrangements of the invention described hereinabove. Such an arrangement may be employed in conjunction with any of the above-described features to further enhance the wrap-around effect so that the area of contact between the masking filaments 44 and the bit-wires 40 may be further increased, resulting in still greater discontinuities in the plating layer deposited on the bit-wires 40 at the end portions of the individual memory cells.

Figure 16:
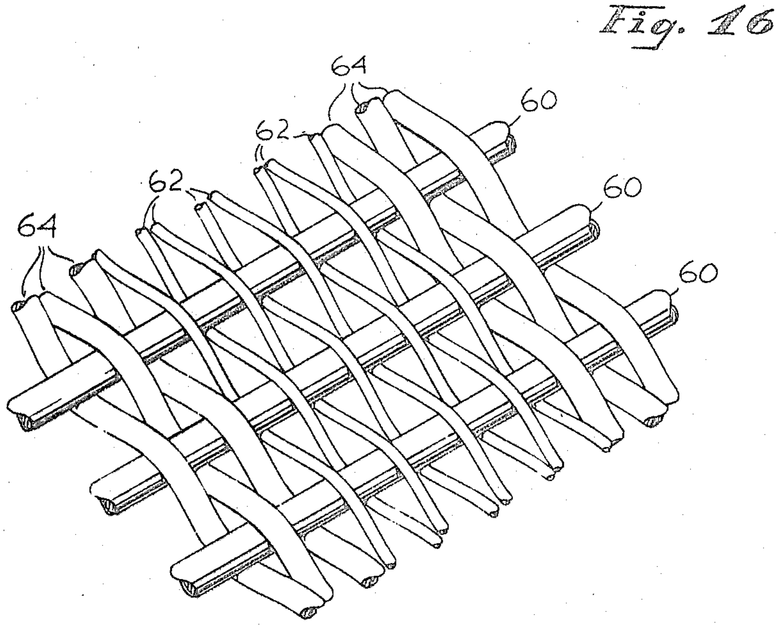
FIG. 16 is a perspective view of a portion of still another particular arrangemnt in accordance with the invention at a particular stage of fabrication.
Figure 17:
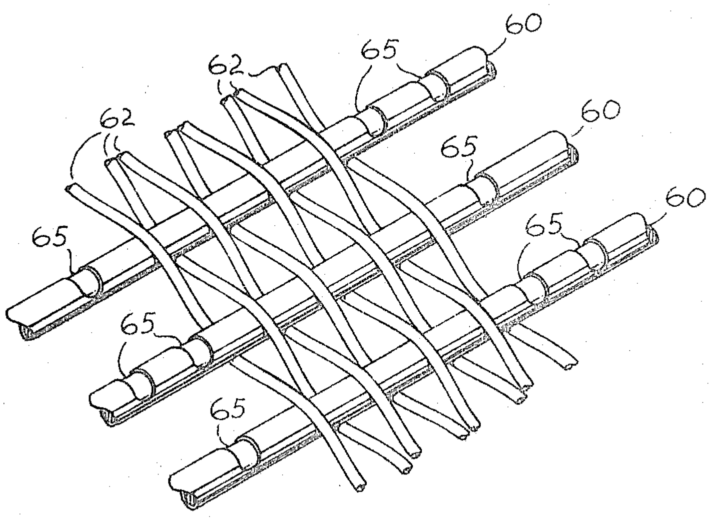
FIG. 17 is a view of the portion depicted in FIG. 16 showing the particular arrangement upon completion of fabrication.

A particular arrangement in accordance with the present invention which may be employed in providing desired storage cell boundaries on preplated bit-wire is shown in FIG. 16. This figure represents a particular woven structure comprising a plurality of preplated bit-wires 60 already having a layer of remanently magnetic material deposited thereon prior to the fabrication step during which the orthogonal drive conductors are added. It should be understood that the drive conductors 62, although shown in a woven screen structure, may correspond to solenoids or any other arrangement for establishing a matrix of storage cells in conjunction with the bit-wires 60. In accordance with an aspect of the invention, one or more masking filaments 64 may be interwoven or threaded among the bit-wires 60 generally parallel to the drive conductors 62 so as to establish a plurality of areas of contact with the bit-wires 60. As shown in FIG. 16, three masking filaments 64 are interwoven at each end of an individual storage cell. The masking filaments 64 are preferably formed of some relatively soft material such as a thermoplastic plastic (e.g. polyethylene) which may be readily removed by a later fabrication step, as by heating the structure to some low temperature at which the filaments 64 melt away from the woven structure but which has no effect on the insulation of the drive conductors 62. In this particular arrangement in accordance with the invention, the woven bit-wire structure is coated with an etchant-resistant coating following the weaving process. This etchant-resistant coating is deposited everywhere on the structure except in the areas of contact between the masking filaments 64 and the bit-wires 60, and in similar areas of contact of lesser extent which may exist between the drive conductors 62 and the bit-wires 60. Following the deposition of the etchant-resistant coating, the masking filaments 64 are removed as described, as by heating or some other suitable method, so as to lay bare the areas along the bit-wires 60 which had been underneath the masking filaments 64 and which are not protected by the etchant-resistant coating. Following the removal of the masking filaments 64, the entire structure is selectively etched, as by immersion in a vat of etchant solution, so as to remove the magnetic layer coating the bit-wires 60 at only those areas which had originally been covered by the masking filaments 64. The areas of contact between the drive conductors 62 and the bit-wires 60, although not coated by the etchant-resistant coating, are still protected from the etching solution by virtue of the fact that the drive conductors 62 and the bit-wires 60 remain in intimate contact at these points. The resulting structure, following the etching step, is as shown in FIG. 17 in which the bit-wires 60 are left with small regions such as 65 in which the magnetic layer originally provided thereon has been removed. By virtue of the fact that the location of these regions 65 is defined by the original position of the masking filaments 64, which were threaded along the edges of the storage cells comprising the drive conductor 62 and the bit-wires 60, the regions 65 are ideally located precisely at the boundaries of the individual storage cells. Since the magnetic layer of the bit-wires 60 is removed at the regions 65 to provide resultant discontinuities in the cylindrical layer originally plated on the bit-wires 60 at these points, domain wall travel is blocked at the regions 65 and, as a result, interference from one storage cell to another along the same bit-wire, which has heretofore been a serious problem with such structures, is eliminated or at least substantially minimized. Accordingly, individual storage cells may be arranged more closely together along a preplated bit-wire with an advantageous increase in the storage cell density of a bit-wire matrix.

Figure 18:
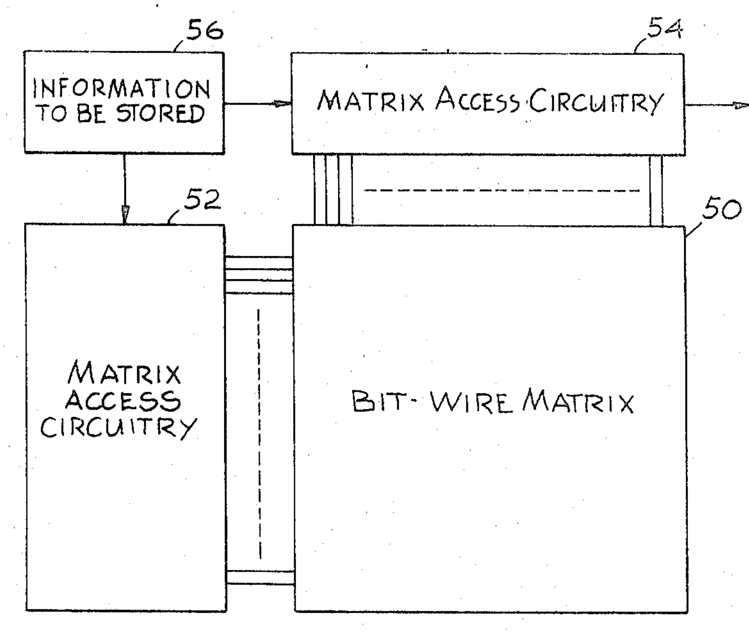
FIG. 18 is a block diagram of circuitry for operating a woven bit-wire matrix in accordance with the invention.

FIG. 18 represents in block diagram form a general configuration for the operation of a bit-wire memory matrix prepared in accordance with the present invention as described above. In FIG. 18, a matrix 50 is represented as connected to matrix access circuitry 52 and 54 arranged to select an individual storage cell within the bit-wire matrix 50 by the application of coincident currents to orthogonal conductors. Information to be stored, represented by the block 56, is supplied to the matrix access circuitry 52 and 54 which applies current to a selected one or more bit-wires and to a selected one or more drive conductors to establish a magnetic field at the particular storage cells which are thus addressed to produce the remanent magnetization states in accordance with the information to be stored. An individual cell may be interrogated by applying a current along the corresponding bit-wire from the matrix access circuitry 52 and detecting the voltage pulse induced on the orthogonal conductor connected to the matrix access circuitry 54, which in turn indicates the particular state of the stored information, represented by the block 58. An individual cell of the bit-wire matrix 50 may be interrogated repetitively without degradation of the stored magnetization state and without unwanted extension of the individual cell boundaries, since such extension is prevented by the particular arrangements in accordance with the invention as described above.

Although there have been described above particular arrangements of a woven bit-wire memory in accordance with the invention for the purpose of illustrating the manner in which the invention may be used to advantage, it will be appreciated that the invention is not limited thereto.

I claim:

1. A bit-wire memory structure comprising a plurality of bit-wires and a plurality of substantially orthogonal filamentary members interwoven to define a plurality of information storage cells, and a layer of remanently magnetic material deposited on said bit-wires except at the areas of contact between said bit-wires and said orthogonal filamentary members.

2. A woven bit-wire memory structure comprising a plurality of bit-wires and a plurality of substantially orthogonal filamentary members interwoven to define a plurality of information storage cells, said orthogonal filamentary members including at least one masking element selectively disposed to establish areas of contact with the bit-wires, and a layer of remanently magnetic material deposited on said bit-wires except at said areas of contact.

3. A woven magnetic memory device comprising a first plurality of wires, a second plurality of wires interwoven substantially orthogonally with said first plurality wires and in contact therewith to form a matrix of individual storage cells, and a layer of remanently magnetic material deposited on the wires of said first plurality except at the areas of contact between respective wires of said first and second pluralities.

4. A magnetic memory device comprising a first plurality of wires, a second plurality of wires interwoven substantially orthogonally with said first plurality of wires, and a layer of remanently magnetic material plated over the resulting woven screen, the second plurality of wires being arranged to prevent the deposition of the plating layer at predetermined points of control along said first plurality of wires.

5. A woven bit-wire memory matrix comprising a plurality of uninsulated conductors interwoven with a plurality of insulated conductors to define individual memory cells, a plurality of masking elements woven with the insulated conductors across the uninsulated conductors in intimate contact therewith, and a layer of remanently magnetic material deposited on said uninsulated conductors substantially continuously over the extent of an individual memory cell but having selectively positioned discontinuities therein at the ends of each memory cell at the positions of contact.

6. A woven bit-wire memory matrix comprising a plurality of bit-wires on which magnetic material may be plated, a plurality of control conductors, and a plurality of masking elements all interwoven to form individual storage cells; the masking elements being arranged in intimate contact with the bit-wires at the crossings of the bit-wires and the masking elements, and a layer of remanently magnetic material selectively plated on said bit-wires in the region adjacent the control conductors but not in the positions of intimate contact between the bit-wires and the masking elements.

7. A woven bit-wire memory matrix in accordance with claim 6 wherein said control conductors are insulated and said masking elements comprise a plastic material which is substantially softer than the insulation covering said control conductors.

8. A woven bit-wire memory matrix in accordance with claim 6 wherein said masking elements comprise filamentary members having a substantially larger cross-sectional area than the cross-sectional area of the control conductors.

9. A woven bit-wire memory matrix in accordance with claim 6 wherein the masking elements are wrapped around a significant portion of the adjacent bit-wires and are maintained in intimate contact therewith.

10. A woven bit-wire memory matrix in accordance with claim 6 wherein the bit-wires are woven in a substantially straight configuration and the masking elements are oven in an over-under weave with said bit-wires.

11. A woven bit-wire memory matrix in accordance with claim 6 wherein the bit-wires and the masking elements are interwoven in a double crimp weave to establish an increased area of contact between the masking elements and the bit-wires at the crossing thereof.

12. A woven bit-wire memory matrix comprising a plurality of bare conductors interwoven with a plurality of masking filaments and a plurality of insulated conductors in a double crimp weave such that the masking filaments and the bare conductors are partially wrapped around each other at the crossings thereof, and a layer of remanently magnetic material plated on the bare conductors except in the regions in which they are masked by the masking filaments.

13. A woven bit-wire memory matrix comprising a plurality of bit-wires interwoven with a plurality of masking filaments and a plurality of drive conductors to form individual memory cells, the masking filaments being spaced relatively close together in groups, the drive conductors being spaced relatively far apart in groups arranged alternately with said groups of masking filaments, and a layer of remanently magnetic material deposited on said bit-wires except in the regions thereof masked by said masking filaments.

14. A woven bit-wire memory matrix comprising a plurality of bare conductors and a plurality of spacing filaments interwoven with a plurality of masking filaments and a plurality of insulated drive conductors to define individual memory cells, the masking filaments being interwoven in a plain over-under weave with said spacing filaments and said bare conductors, the control conductors being interwoven in a skip weave to pass over said bare conductors and between only adjacent pairs of spacing filaments, and a layer of remanently magnetic material selectively plated on only the exposed portions of the bare conductors which are not masked by said masking filaments.

15. A bit-wire memory structure comprising a plurality of bit-wires having a layer of remanently magnetic material deposited thereon, a plurality of insulated drive conductors arranged with said bit-wires to form a matrix of information storage cells, at least one masking filament arranged with said insulated drive conductors to establish areas of contact with said bit-wires, said masking filament being fabricated of a material which may be readily removed to leave areas of said magnetic layer which may be etched away to define selectively located discontinuities along the boundaries of said storage cells.

16. A bit-wire memory structure comprising a plurality of bit-wires having a layer of remanently magnetic material deposited thereon, a plurality of insulated drive conductors arranged with said bit-wires to form a matrix of information storage cells, at least one masking filament arranged along the boundary of each storage cell to establish areas of contact with said bit-wires, said masking filaments being fabricated of a material which may be readily removed to leave bare areas of said magnetic layer which may be etched away to prevent domain wall travel across the boundaries of said storage cells.

References Cited

UNITED STATES PATENTS

| | | | |
|---|---|---|---|
| 3,134,965 | 5/1964 | Meier | 340—174 |
| 3,223,986 | 12/1965 | Clark | 340—174 |
| 3,221,312 | 11/1965 | MacLachlan | 340—174 |

JAMES W. MOFFETT, Primary Examiner